United States Patent
Brusilovsky et al.

(10) Patent No.: US 7,116,970 B2
(45) Date of Patent: Oct. 3, 2006

(54) SELECTION OF NETWORKS BETWEEN WLAN AND 2G/3G NETWORKS BASED ON USER AND PROVIDER PREFERENCES

(75) Inventors: Alec Brusilovsky, Naperville, IL (US); Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 528 days.

(21) Appl. No.: 10/159,564

(22) Filed: May 31, 2002

(65) Prior Publication Data

US 2004/0203732 A1 Oct. 14, 2004

(51) Int. Cl.
H04Q 7/20 (2006.01)
H04Q 7/24 (2006.01)
H04K 1/00 (2006.01)

(52) U.S. Cl. .................. 455/411; 455/426; 380/270; 380/278; 380/279; 380/283; 370/338; 370/328; 370/389; 370/401

(58) Field of Classification Search ............... 455/465, 455/432, 437, 557, 466; 370/328, 329, 331, 370/338, 352; 709/200
See application file for complete search history.

(56) References Cited

U.S. PATENT DOCUMENTS

| | | | |
|---|---|---|---|
| 6,243,581 B1 * | 6/2001 | Jawanda .................. 455/432.2 |
| 6,671,507 B1 * | 12/2003 | Vinck .......................... 455/411 |
| 2002/0128035 A1 * | 9/2002 | Jokinen et al. .............. 455/552 |
| 2003/0118015 A1 * | 6/2003 | Gunnarsson et al. ........ 370/389 |
| 2003/0134650 A1 * | 7/2003 | Sundar et al. .............. 455/465 |
| 2003/0139180 A1 * | 7/2003 | McIntosh et al. ........... 455/426 |
| 2004/0147262 A1 * | 7/2004 | Lescuyer et al. ........... 455/434 |
| 2004/0166841 A1 * | 8/2004 | Parmar et al. ........... 455/422.1 |
| 2004/0166843 A1 * | 8/2004 | Hahn ....................... 455/426.2 |
| 2004/0192264 A1 * | 9/2004 | Liu et al. ................. 455/414.1 |
| 2005/0021586 A1 * | 1/2005 | Bichot et al. ............... 709/200 |
| 2005/0107085 A1 * | 5/2005 | Ozluturk ..................... 455/439 |

* cited by examiner

Primary Examiner—Joseph Feild
Assistant Examiner—Julio Perez

(57) ABSTRACT

A method of administering network selections for a mobile station between a second generation/third generation wireless network and wireless local area networks includes detecting when the mobile station encounters a wireless area network, and communicating an identity of the encountered wireless area network to the second generation/third generation wireless network. The communicating prompts a query for permission to establish a session between the mobile station and the encountered wireless local area network. When permission is granted, the method includes receiving a key distributed to the mobile station. The key is used by the mobile station to establish a session between the mobile station and the encountered wireless local area network.

30 Claims, 4 Drawing Sheets

SELECTION OF NETWORKS BETWEEN WLAN AND 2G/3G NETWORKS BASED ON USER AND PROVIDER PREFERENCES

FIELD OF THE INVENTION

The present invention relates to the art of wireless communications and/or networks. It will be described with particular reference thereto. However, it is to be appreciated that the present invention is also amenable to other like applications.

BACKGROUND OF THE INVENTION

Second generation (2G) (e.g., digital personal communication services (PCS)) and third generation (3G) wireless technologies typically provide data access rates which vary from a low of, e.g., approximately 14.4 kilobytes/second (Kbps) for 2G, to a medium rate of, e.g., somewhere around 384 Kbps, to a maximum high end of, e.g., approximately 2 megabytes/second (Mbps) for 3G. These rates are generally adequate for services employing a low to medium bandwidth, e.g., voice communications, text messaging, instant messaging, electronic mail (e-mail) with no or relatively small attachments, etc. These data access rates tend to be marginal, if not sufficient at all, for services which demand or would otherwise benefit from a higher bandwidth, e.g., video e-mail, full motion video on demand, large file downloads, etc. However, a Wireless Local Area Network (WLAN) employing, e.g., the Institute of Electrical and Electronics Engineers (IEEE) 802.11 family of protocols, HIgh PErformance Radio Local Area Network HIPERLAN standards, or other like protocols, specifications or standards, can achieve data access rates from 2 to 55 Mbps.

The installation of and/or access to WLANs is becoming more widespread. In addition to offices, WLANs can be found in many places including, e.g., airports, hotels, restaurants, educational institutions and/or campuses, etc. Often, depending upon the amount of data and/or speed desired, it would be advantageous to utilize the relatively faster data access rates achievable via the WLAN when it is available. However, the geographic range of a WLAN is more limited as compared to 2G and 3G wireless technologies. Therefore, mobility is relatively limited with a WLAN.

The present invention contemplates a new and improved method and/or system for handling wireless network selection which overcomes the above-referenced problems and others.

SUMMARY OF THE INVENTION

In accordance with an aspect of the present invention, a method of administering network selections between a second generation/third generation wireless network and wireless local area networks is provided for a mobile station. The method includes detecting when the mobile station encounters a wireless area network, and communicating an identity of the encountered wireless area network to the second generation/third generation wireless network. The communicating prompts a query for permission to establish a session between the mobile station and the encountered wireless local area network. When permission is granted, the method includes receiving a WLAN encryption key distributed to the mobile station. The encryption key is used by the mobile station to establish a session between the mobile station and the encountered wireless local area network.

In accordance with another aspect of the present invention, a client is provided. The client administers network selections of a mobile communications device between a second generation/third generation wireless network and wireless local area networks. The client includes: means for detecting when the mobile station encounters a wireless area network; means for communicating an identity of the encountered wireless area network to the second generation/third generation wireless network, the communicating prompting a query for permission to establish a session between the mobile station and the encountered wireless local area network; and, means for receiving a key distributed to the mobile station when permission is granted, the key being used by the mobile station to establish a session between the mobile station and the encountered wireless local area network.

In accordance with yet another aspect of the present invention, a method of administering network selections for a mobile station between a second generation/third generation wireless network and wireless local area networks includes: receiving a communication from the mobile station over the second generation/third generation wireless network when the mobile station encounters a wireless area network, the communication providing an identity of the wireless area network encountered; and, querying the encountered wireless local area network for permission for the mobile station to establish a session with the encountered wireless local area network such that when permission is granted, an encryption key is distributed to the mobile station, the encryption key being used by the mobile station to establish the session with the encountered wireless local area network.

One advantage of the present invention is the ability to provide for network selection between 2G/3G networks and WLANs.

Another advantage of the present invention is the ability to provide for dynamic provisioning of conditions and/or behaviors for network selections between 2G/3G networks and WLANs.

Another advantage of the present invention is the ability to base network selections between 2G/3G networks and WLANs on user and/or provider preferences.

Yet another advantage of the present invention is the ability to provide shifted data transfers.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

DETAILED DESCRIPTION OF THE INVENTION

Figure 1:
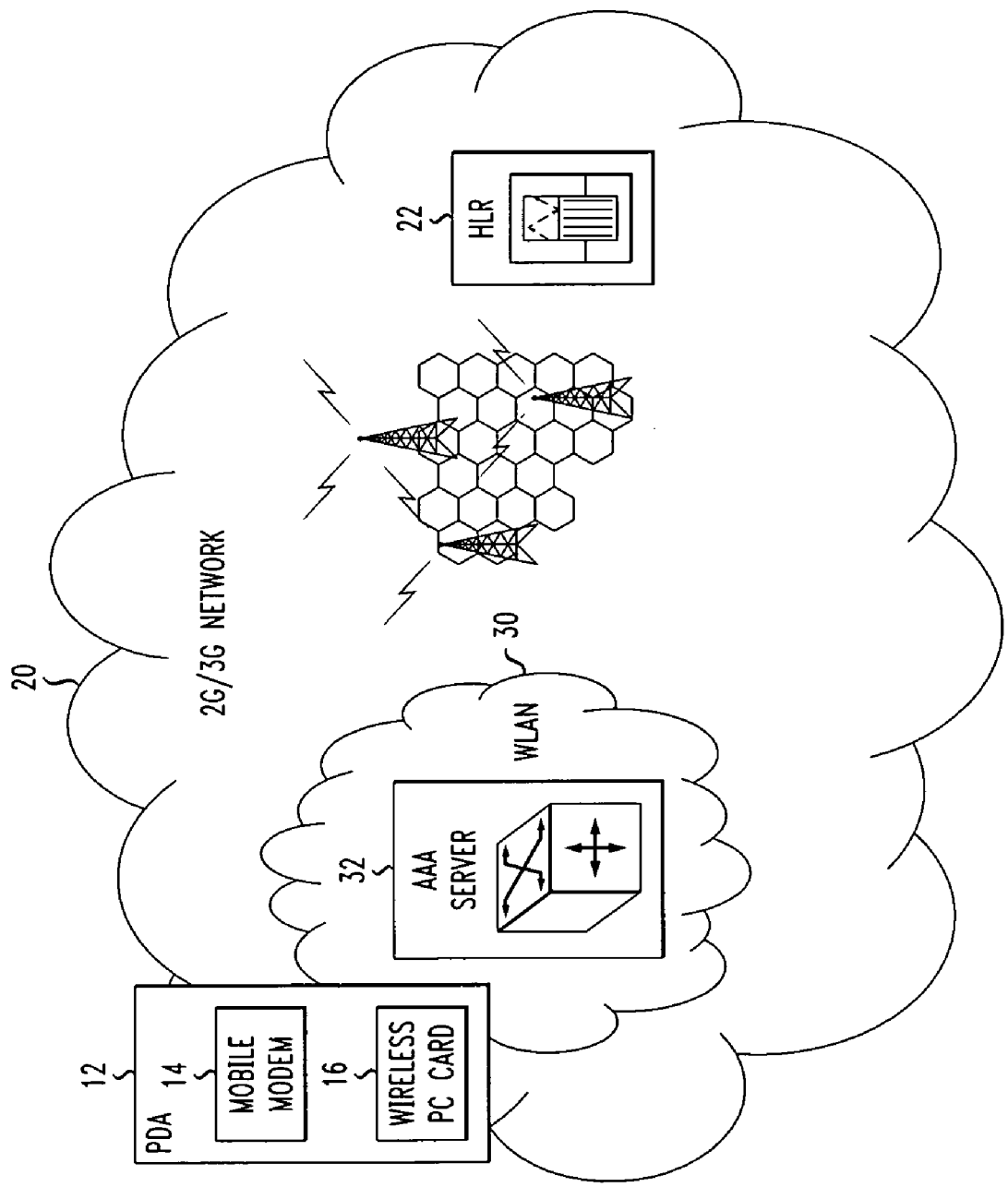
FIG. 1 is diagrammatic illustration showing a mobile station functional with both a 2G/3G network and a WLAN in accordance with aspects of the present invention.
Figure 2:
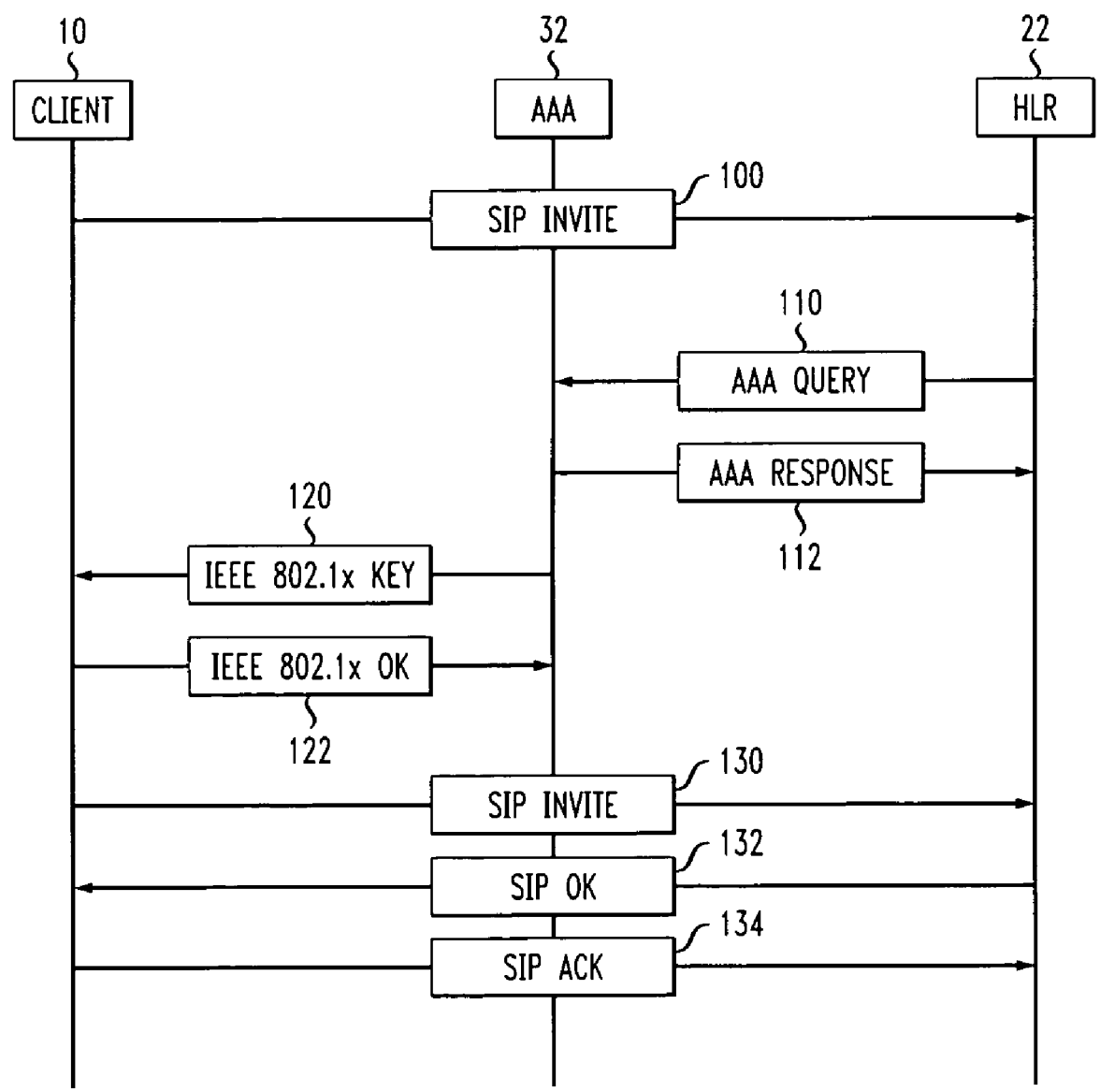
FIG. 2 is an event diagram illustrating an exemplary network selection process administered by a client running on the mobile station of FIG. 1.

With reference to FIGS. 1 and 2, a mobile station preferably includes a client 10 running on a mobile communications device 12. As shown, the device 12 is a personal digital assistant (PDA) equipped with radio frequency (RF) or like interfaces, including: a 2G/3G interface 14 (e.g., a mobile modem or the like) which enables selective wireless connection of the device 12 to a 2G and/or 3G network 20; and, a WLAN interface 16 (e.g., a WLAN PC card or the like) which enables selective wireless connection of the device 12 to a WLAN 30. Optionally, a common interface which enables selective wireless connection to both networks may be employed. Preferably, the WLAN 30 employs a protocol such as, e.g., the IEEE 802.11 family of protocols (as shown), the HIPERLAN protocol, and/or another like protocol. While the device shown is a PDA, other similarly equipped mobile communications devices are contemplated. Suitable mobile communications devices include, e.g., mobile phones, laptop computers, etc., equipped with interfaces 14 and 16.

The client 10 handles the selection of network connections for the device 12 when there is overlapping geographic coverage, and administers hand-offs between the 2G/3G network 20 and the WLAN 30. That is to say, the client 10 controls or regulates the selective connection of the device 12 to the 2G/3G network 20 and/or the WLAN 30. While only the single WLAN 30 is shown for simplicity and clarity herein, it is to be appreciated that a plurality of similarly situated WLANs to which the client 10 administers may exist within the boundaries of the 2G/3G network 20. In addition, it is to be appreciated that a plurality of the WLANs may have geographic coverage areas that also overlap with one another. Preferably, the client 10 employs Session Initiation Protocol (SIP) or the like to communicate with the 2G/3G network 20 for the administration of the network selection process.

In what is nominally termed herein the normal operational mode, which is the operational mode when the device 12 is outside the geographic boundaries of the WLAN 30, the device 12 connects to and/or interfaces with the 2G/3G network 20 in the usual manner. There is no network selection to be administered by the client 10 since the WLAN 30 is unavailable. In the normal operational mode, the mobile station is free to roam within the boundaries of the 2G/3G network 20. Upon encountering the WLAN 30, however, it may be desirable to connect the device 12 therewith, e.g., to obtain the benefit of a faster data access rate. Accordingly, the client 10 administers the network selection process.

When the presence of the WLAN 30 is detected or otherwise made known to the device 12, e.g., due to the mobile station entering the geographic boundaries of the WLAN 30, the client 10 captures the WLAN's name, identifier and/or other pertinent information (e.g., provider information). Preferably, the client 10 is periodically, or otherwise as desired, checking for WLANs via the interface 16.

Using the interface 14 of the device 12, the captured information or data is sent in the body of a SIP INVITE message 100 or other like session initiator over the 2G/3G network 20 to the 2G/3G network's Authentication, Authorization and Accounting (AAA) functional entity, shown here as a home location register (HLR) 22 for the 2G/3G network 20. In response to the received INVITE message 100, the HLR 22 sends a corresponding AAA Query 110, employing a protocol such as, e.g., Remote Authentication Dial In User Service (RADIUS), DIAMETER, Light Directory Access Protocol (LDAP), WEB service, etc., to an AAA server 32 for the WLAN 30. Upon verification of the identity and permissions for the mobile station or user thereof by the AAA server 32, the AAA server 32 sends an AAA Response 112 to the HLR 22, and initiates a WLAN crypto key distribution, e.g., via the IEEE 802.11 protocol (as shown) or some other comparable protocol. The AAA Query and Response 110 and 112, respectively, are preferably carried over wire lines and/or other network connections which join the AAA server 32 and the HLR 22.

Preferably, the crypto key distribution includes sending an encryption key 120 to the client 10 running on the device 12, which then, if properly received, responds with an OK message 122 sent to the AM server 32. Preferably, the crypto key distribution is carried out over the WLAN 30. The crypto key distribution permits the client 10 to establish and conduct a session on the WLAN 30 via the interface 16 of the device 12. Note, 802.1x is an authentication and encryption key distribution protocol for the 802 family of network specification (i.e., 802.3—wired Ethernet, and/or 802.11a, b, g - wireless Ethernet). Of course, other suitable encryption protocols may be used.

Preferably after the crypto key distribution, the client 10 sends another SIP INVITE message 130 to the HLR 22 via the 2G/3G network 20 signaling that the crypto key distribution is complete. The HLR 22 sends back a SIP OK message 132 to the client 10 over the 2G/3G network 20 to determine if and/or confirm that the session as been properly established with the WLAN 30. Provided that the session has been properly established, the client 10 replies over the 2G/3G network 20 with a SIP acknowledge (ACK) message 134 confirming the same.

The mobile station, having established a session on the WLAN 30, is now free to roam within the boundaries thereof while enjoying the enhanced data access rate provided by the WLAN 30, as compared to the 2G/3G network 20. The mobile station has been effectively handed-off from the 2G/3G network 20 to the WLAN 30.

In a preferred embodiment, the client 10 is programmed with or has access to a selectable, default and/or otherwise determined set of user preferences 200 (see FIG. 4) which are employed to regulate hand-offs between the 2G/3G network 20 and the WLAN 30. In this manner, the administration of the network selection process by the client 10 may be tailored or customized to the user's preferences. The user preferences 200, for example, optionally specify time, date and/or location restrictions outside of which the user does not desire to have the mobile station handed-off to the WLAN 30. The user preferences 200 also optionally specify which WLAN to favor for network selection purposes when more than one WLAN is available.

Via the user preferences 200, the transparency of hand-offs may also be set. For example, the user preferences 200 may specify levels of transparency for selected WLANs to which the mobile station may be handed-off. If desired by the user, the preference for hand-offs to the WLAN 30 may be set for completely transparency, in which case a hand-off thereto would proceed as described. Alternately, if desired by the user, the preference for hand-offs to the WLAN 30 may be set for confirmation, in which case, once the WLAN 30 is detected by the device 12, the client 10 obtains (e.g., via a pop up window or the like) confirmation from the user of the mobile station that the hand-off to the WLAN 30 is desired before proceeding. Of course, different WLANs can be set to different levels of transparency, or they could all be set the same, they could all default to complete transparency, or otherwise, as desired.

Figure 3:
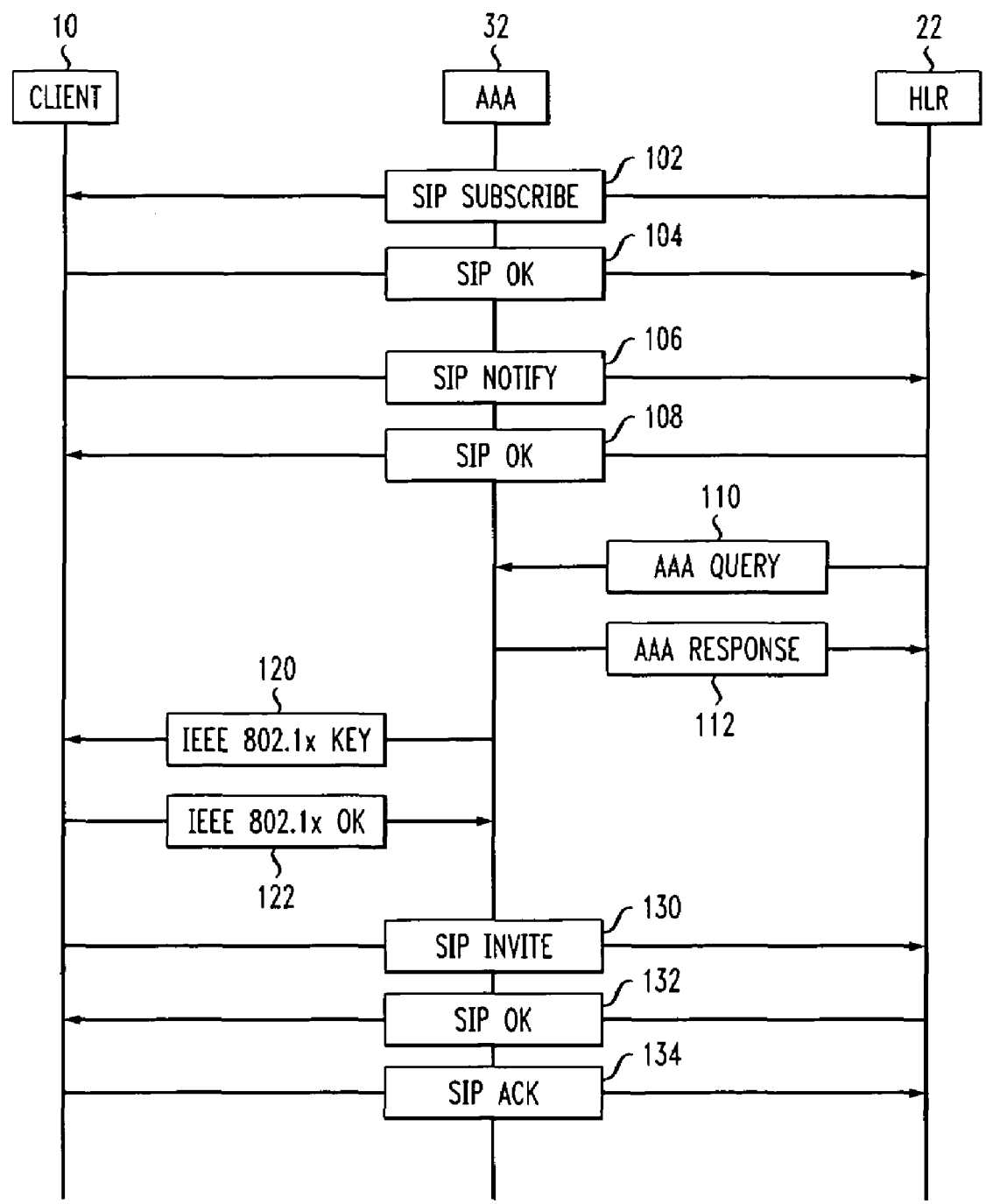
FIG. 3 is an event diagram illustrating another exemplary network selection process administered by a client running on the mobile station of FIG. 1.

With reference to FIG. 3, the following embodiment includes some structural and/or functional components or steps which are the same as or similar to those described in the previous embodiment. For clarity and simplicity herein, these components or steps are referenced using the same reference numerals used previously.

Preferably, a network operator or service provider, which provides the network service or services to the mobile station over the 2G/3G network 20 and/or the WLAN 30, is optionally able to provision, among other factors, conditions and behaviors for the network selection process administered by the client 10. As shown in FIG. 3, when the mobile station is activated, periodically, or as otherwise desired, the HLR 22 sends the client 10 a SIP SUBSCRIBE message 102 or the like over the 2G/3G network 20. Upon proper receipt of the SIP SUBSCRIBE message 102, the client 10 responds, to confirm the same, with a SIP OK message 104 or the like sent to the HLR 22 over the 2G/3G network 20.

When the presence of the WLAN 30 is detected or otherwise made known to the device 12, e.g., due to the mobile station entering the geographic boundaries of the WLAN 30, the client 10 captures the WLAN's name, identifier and/or other pertinent information (e.g., provider information). Using the interface 14 of the device 12, a SIP NOTIFY message 106 or the like is sent from the client 10 over the 2G/3G network 20 to the HLR 22. The SIP NOTIFY message 106 notifies or alerts the HLR 22 that the identified WLAN 30 has been encountered. In response to proper reception of the SIP NOTIFY message 106, the HLR 22 sends the client 10 a SIP OK message 108 or the like over the 2G/3G network 20 to confirm the reception. Thereafter, the hand-off proceeds the same as or similar to that which is shown in FIG. 2.

The SIP SUBSCRIBE message 102 sets or otherwise specifies service provider preferences 202 (see FIG. 4) which operate (or optionally are) the same as or similar to the user preferences. That is to say, the provider preferences 202 program the client 10 or are accessible thereto, such that the administration of the network selection process by the client 10 is tailored or customized to take into account the provider's preferences. For example, the provider preferences 202 optionally specify: time, date and/or location restrictions outside of which the mobile station may not be handed-off to the WLAN 30; which WLAN to favor for network selection purposes when more than one WLAN is available; the transparency (from the user's perspective) of hand-offs; etc. Additionally, the provider preferences 202 optionally specify the WLANs and/or services available to the mobile station. Being that the service provider sets these preferences, they can be updated as circumstances change (e.g., as services are added or removed, or WLANs are added or removed, etc.), thereby dynamically provisioning, from the provider side without direct interaction or input from the user side, the conditions and/or behaviors of the network selection process administered by the client 10.

Figure 4:
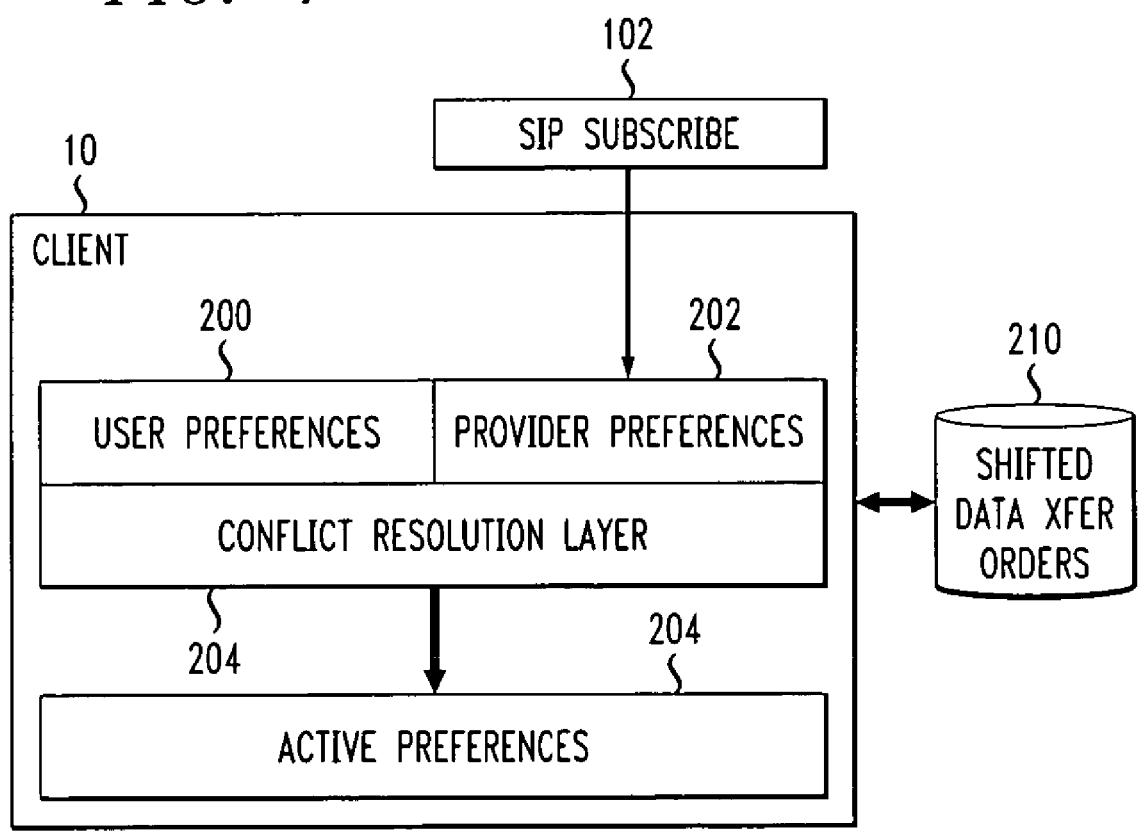
FIG. 4 is diagrammatic illustration showing an exemplary client which runs on the mobile station of FIG. 1 and administers a network selection process and/or shifted data transfers in accordance with aspects of the present invention.

With added reference to FIG. 4, the client 10 is shown with user preferences 200 and provider preferences 202. On occasion, the preferences 200 and 202 may be in conflict. Preferably, a conflict resolution layer 204 of the client 10 is programmed or otherwise provides for resolution of any conflicts to achieve a set of active preferences 206 upon which the client 10 relies to tailor administration of the network selection process. Operation of the conflict resolution layer 204 is optionally programmable, selectable, predefined, defaulted or otherwise determined to achieve desired overriding results such as, e.g., having one set of preferences always override the other, or having selected preferences from either set be the overriding one, or having selected overriding preferences conditioned on time, date, location, the WLAN concerned, etc. The overriding preference is then the one passed to the active preferences 206. Where no conflict exists, preferences are preferably passed to the active preferences 206 from either or both of the user and/or provider preferences 200 and/or 202, respectively. Optionally, when a conflict arises, the conflict resolution layer 204 creates a modified preference taking into account both the user and provider preference to set, selected, or otherwise determined degrees. The modified preference is then the one passed to the active preferences 206.

The provisioning of hand-offs between the 2G/3G network 20 and the WLAN 30 opens the door for shifted data transfers, which, in a preferred embodiment, are also administered by the client 10. Shifted transfers optionally include both "shift-in-time" and "shift-in-space" data transfers.

A shift-in-time data transfer is where the mobile station requests or orders a data transfer from a device or service over the 2G/3G network 20 and receives delivery of that data over a WLAN at a later time when the mobile station has been handed-off thereto. Alternately, another entity, device or service may request or order the data transfer to the mobile station. Optionally, delivery may automatically commence upon the mobile station's very next established session on any WLAN after an order has been placed, or after some designated period has lapsed. Such a shift-in-time data transfer is particularly beneficial when the data being transferred is not desired immediately and may be voluminous. In this case, it is preferable to wait and make the transfer when the data access rate benefits of a WLAN are available.

A shift-in-space data transfer is where the mobile station requests or orders a data transfer from a device or service over the 2G/3G network 20 and receives delivery of that data over a specified WLAN when the mobile station has been handed-off thereto. Alternately, another entity, device or service may request or order the data transfer to the mobile station. Optionally, delivery may automatically commence upon the mobile station's very next established session on the specified WLAN after an order has been placed, or after some designated period has lapsed. Such a shift-in-space data transfer is particularly beneficial when the data being transferred is to be used or is desired at a specific location, and may be voluminous. In this case, it is preferable to wait and make the transfer when the data access rate benefits of a WLAN are available. For example, a presentation may be ordered over the 2G/3G network 20 for delivery to a specified meeting room utilizing the WLAN 30 while the mobile station is en-route thereto. Upon arrival, the presentation is transferred to the mobile station over the WLAN 30.

In one embodiment, as shown in FIG. 4, shifted data transfer orders are maintained in a database 210 or the like which is accessed by or otherwise available to the client 10 for administration of shifted data transfers. They may be enter through the device 12 by a user of the mobile station, or received via the 2G/3G network 20 or the WLAN 30. The database 210 and/or orders therein are monitored by the client 10 and include pertinent information for execution of delivery (e.g., identification of the data to be transferred, delivery location, designated delay, the origin of the data to be transferred, etc.). When the designated or otherwise determined condition for delivery is achieved, the client 10 triggers the transfer of the data over the WLAN 30.

Alternately, in a similar fashion, the database 210 may be maintained on the service provider side. In the case of shift-in-space data transfers, the orders may be maintained at the WLAN level with each order residing on its designated WLAN. In the case of shift-in-time data transfers, the orders are preferably maintain at the 2G/3G network level being that a particular WLAN is not specified.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of administering network selections for a mobile station between a second generation/third generation wireless network and wireless local area networks, said method comprising:
   (a) detecting when the mobile station encounters a wireless local area network;
   (b) communicating an identity of the encountered wireless local area network from the mobile station to the second generation/third generation wireless network, said communicating prompting a query for permission to establish a session between the mobile station and the encountered wireless local area network, said query being sent from the second generation/third generation wireless network to the encounter wireless local area network; and,
   (c) when permission to establish the session is granted by the encountered wireless local network in response to the query, receiving a key distributed to the mobile station, said key being used by the mobile station to establish a session between the mobile station and the encountered wireless local area network.

2. The method of claim 1, wherein the communicating of step (b) is carried out over the second generation/third generation wireless network.

3. The method of claim 2, wherein the communicating of step (b) is directed to an authentication, authorization and accounting functional entity of the second generation/third generation wireless network.

4. The method of claim 3, wherein the authentication, authorization and accounting functional entity of the second generation/third generation wireless network is a home location register.

5. The method of claim 1, wherein the key is distributed over the encountered wireless local area network.

6. The method of claim 5, wherein the key is distributed from an authentication, authorization and accounting server of the encountered wireless local area network.

7. The method of claim 1, further comprising:
   (d) informing the second generation/third generation wireless network when a session is established between the mobile station and the encountered wireless local area network.

8. The method of claim 1, wherein the query for permission is directed to the encountered wireless local area network from the second generation/third generation wireless network.

9. A method of administering network selections for a mobile station between a second generation/third generation wireless network and wireless local area networks, said method comprising:
   (a) detecting when the mobile station encounters a wireless local area network;
   (b) communicating an identity of the encountered wireless local area network to the second generation/third generation wireless network, said communicating prompting a query for permission to establish a session between the mobile station and the encountered wireless local area network, said query being sent from the second generation/third generation wireless network to the encountered wireless local area network;
   (c) when permission to establish the session is granted by the encountered wireless local area network in response to the query, receiving a key distributed to the mobile station, said key being used by the mobile station to establish a session between the mobile station and the encountered wireless local area network; and,
   (d) maintaining user preferences which control the administering of network selections, said user preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network.

10. A method of administering network selections for a mobile station between a second generation/third generation wireless network and wireless local area networks, said method comprising:
    (a) detecting when the mobile station encounters a wireless local area network;
    (b) communicating an identity of the encountered wireless local area network to the second generation/third generation wireless network, said communicating prompting a query for permission to establish a session between the mobile station and the encountered wireless local area network, said query being sent from the second generation/third generation wireless network to the encountered wireless local area network;
    (c) when permission to establish the session is granted by the encountered wireless local area network in response to the query, receiving a key distributed to the mobile station, said key being used by the mobile station to establish a session between the mobile station and the encountered wireless local area network; and,
    (d) maintaining user preferences which control the administering of network selections, said user preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network.

11. The method of claim 10, further comprising: selections for a mobile station between a second generation/third generation wireless network and wireless local area networks, said method comprising:
    (a) detecting when the mobile station encounters a wireless local area network;

(b) communicating an identity of the encountered wireless local area network to the second generation/third generation wireless network, said communicating prompting a query for permission to establish a session between the mobile station and the encountered wireless local area network, said query being sent from the second generation/third generation wireless network to the encountered wireless local area network;

(c) when permission to establish the session is granted by the encountered wireless local area network in response to the query, receiving a key distributed to the mobile station, said key being used by the mobile station to establish a session between the mobile station and the encountered wireless local area network; and, (d) maintaining user preferences which control the administering of network selections, said user preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network.

(e) receiving the provider preferences over the second generation/third generation wireless network from at least one of a service provider employing the second generation/third generation wireless network, and an operator of the second generation/third generation wireless network.

12. The method of claim 11, wherein provider preferences are dynamically updated to reflect changes therein.

13. A client which administers network selections of a mobile communications device between a second generation/third generation wireless network and wireless local area networks, said client comprising:

means for detecting when the mobile communications device encounters a wireless local area network;

means for communicating an identity of the encountered wireless area local area network to the second generation/third generation wireless network, said communicating prompting a query for permission to establish a session between the mobile station and the encountered wireless local area network; and, means for receiving a key distributed to the mobile station when permission is granted, said key being used by the mobile station to establish a session between the mobile station and the encountered wireless local area network.

14. The client of claim 13, wherein the client runs on the mobile communications device.

15. The client of claim 14, wherein the mobile communications device is one of a personal digital assistant, a mobile phone, or a laptop computer.

16. The client of claim 14, wherein the mobile communications device includes:

a first interface which selectively provides a wireless connection to the second generation/third generation wireless network; and, a second interface which selectively provides a wireless connection to the wireless local area networks.

17. The client of claim 16, wherein the first interface is a wireless modem, and the second interface is a wireless PC card.

18. The client of claim 13, further comprising:

means for maintaining user preferences which control the administering of network selections, said user preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network; and, means for maintaining provider preferences which control the administering of network selections, said provider preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network.

19. The client of claim 18, further comprising:

means for dynamically receiving updates to the provider preferences over the second generation/third generation wireless network from at least one of a service provider employing the second generation/third generation wireless network, and an operator of the second generation/third generation wireless network.

20. The client of claim 18, further comprising:

a conflict resolution layer which resolves conflicts between the user and provider preferences to achieve a set of active preference which control the administering of network selections.

21. The client of claim 12, further comprising:

means for administering shifted data transfers including at least one of shift-in-time data transfers and shift-in-space data transfers.

22. The client of claim 21, wherein the means for administering shifted data transfers includes means for accessing a database in which orders for shifted data transfers are maintained.

23. A method of administering network selections for a mobile station between a second generation/third generation wireless network and wireless local area networks, said method comprising:

(a) receiving a communication from the mobile station over the second generation/third generation wireless network when the mobile station encounters a wireless area network, said communication providing an identity of the wireless area network encountered; and, (b) querying the encountered wireless local area network for permission for the mobile station to establish a session with the encountered wireless local area network such that when permission is granted, a key is distributed to the mobile station, said key being used by the mobile station to establish the session with the encountered wireless local area network.

24. The method of claim 23, wherein the communication is received by an authentication, authorization and accounting functional entity of the second generation/third generation wireless network.

25. The method of claim 24, wherein the authentication, authorization and accounting functional entity of the second generation/third generation wireless network is a home location register.

26. The method of claim 23, wherein the querying is directed to an authentication, authorization and accounting server of the encountered wireless local area network.

27. The method of claim 26, wherein the key is distributed to the mobile station over the encountered wireless local area network.

28. The method of claim 23, further comprising:
(c) receiving an indication from the mobile station over the second generation/third generation wireless network when a session is established between the mobile station and the encountered wireless local area network.

29. The method of claim 23, further comprising:
(c) providing to the mobile station over the second generation/third generation wireless network preferences which control the administering of network selections, said preferences specifying at least one of: a time, date or location restriction outside of which the mobile station is not to be handed-off to a wireless local area network; which wireless local area networks the mobile station can be handed-off to; which wireless local area network to favor when more than one wireless local area network is available; and, a hand-off transparency for a wireless local area network.

30. The method of claim 29, wherein the preferences are iteratively provided to the mobile station over the second generation/third generation wireless network to dynamically update changes in the preferences.

* * * * *